United States Patent

Taubitz et al.

[11] Patent Number: 4,797,453
[45] Date of Patent: Jan. 10, 1989

[54] GRAFT POLYMERS OF POLYPHENYLENE ETHERS

[75] Inventors: Christof Taubitz, Wachenheim; Hermann Gausepohl, Mutterstadt; Erhard Seiler, Ludwigshafen; Lothar Schlemmer, Maxdorf, all of Fed. Rep. of Germany

[73] Assignee: BASF Aktiengesellschaft, Ludwigshafen, Fed. Rep. of Germany

[21] Appl. No.: 63,687

[22] Filed: Jun. 19, 1987

[30] Foreign Application Priority Data

Jun. 25, 1986 [DE] Fed. Rep. of Germany ....... 3621207

[51] Int. Cl.$^4$ .............................. C08L 71/02
[52] U.S. Cl. .................. 525/397; 525/391; 525/392
[58] Field of Search ............ 525/391, 392, 397

[56] References Cited

U.S. PATENT DOCUMENTS

| | | |
|---|---|---|
| 3,862,263 | 1/1975 | Maruta et al. |
| 3,928,497 | 12/1975 | Ohmori et al. |
| 4,132,684 | 1/1979 | Izawa et al. |
| 4,148,843 | 4/1979 | Goossens |
| 4,283,511 | 8/1981 | Ueno et al. |
| 4,456,736 | 6/1984 | Miyashita et al. |
| 4,654,405 | 3/1987 | Jalbert et al. ............ 525/391 |

Primary Examiner—Jacob Ziegler
Attorney, Agent, or Firm—Keil & Weinkauf

[57] ABSTRACT

Graft polymers of
(A) a polyphenylene ether as a base polymer and
(B) a half ester of an unsaturated dicarboxylic acid of the general formula

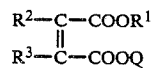

as a graft monomer, where $R^1$ is $C_1$–$C_{25}$-alkyl, $C_2$–$C_{25}$-alkylene or aryl, $R^2$ and $R^3$ are each H, Br, Cl or one of the radicals $R^1$, and Q is H or an alkali metal, an alkaline earth metal or an ammonium cation, with or without
(C) further olefinically unsaturated monomers,
and their preparation.

4 Claims, No Drawings

GRAFT POLYMERS OF POLYPHENYLENE ETHERS

The present invention relates to graft polymers
(A) a polyphenylene ether as a base polymer and
(B) a half ester of an unsaturated dicarboxylic acid of the general formula $$R^2-\underset{\underset{R^3-C-COOQ}{\|}}{C}-COOR^1 \qquad I$$

as a graft monomer, where $R^1$ is $C_1$–$C_{25}$-alkyl, $C_2$–$C_{25}$-alkylene or aryl, $R^2$ and $R^3$ are each hydrogen, bromine, chlorine or one of the radicals $R^1$, and Q is hydrogen, an alkali metal, one equivalent of an alkaline earth metal or an ammonium cation,
with or without
(C) further olefinically unsaturated monomers.

The present invention furthermore relates to the preparation of these graft polymers.

It is known that polyphenylene ethers can be modified by grafting with olefinically unsaturated compounds to improve their performance characteristics. For example, styrene (cf. for example U.S. Pat. Nos. 3,862,263, 4,132,684 or 4,148,843), vinylpyridine (cf. U.S. Pat. No. 4,278,777), methyl methacrylate (cf. EP-A-54 140), unsaturated carboxylic acids (cf. EP-A-25 200) or a mixture of styrene and acrylonitrile (cf. EP-A-83 098 and 59 482, U.S. Pat. Nos. 3,522,326 and 4,486,568 and DE-A-3 100 534) can be grafted onto polyphenylene ethers by a conventional polymerization method. A mixture of styrene and maleic anhydride (EP-A-17939 or JP-B-77/19864) was grafted onto a polyphenylene ether in order, inter alia, to increase its adhesion to inorganic materials. In general, the process is carried out in the presence of an organic peroxide as a free radical initiator, in solution or aqueous dispersion or in an extruder.

It is also known that maleic half esters can be used for grafting, but on other substrates, ie. polymers of ethylene (U.S. Pat. No. 3,928,497), to improve adhesion and the melt flow.

However, the known polyphenylene ether graft polymers still have some disadvantages; in particular, products which are sufficiently heat-stable exhibit pronounced discoloration.

It is an object of the present invention to provide modified polyphenylene ether resins which remedy this deficiency.

We have found that this object is achieved by the polyphenylene ether resins defined at the outset.

We have furthermore found processes for the preparation of these polyphenylene ether resins.

Suitable base polymers A are polyphenylene ethers which are prepared by oxidative coupling by a conventional process from phenols which are disubstituted in the ortho position by alkyl (cf. U.S. Pat. Nos. 3,661,848, 3,219,625, 3,378,505, 3,306,874, 3,306,875 and 3,639,656). Examples of suitable polyphenylene ethers are poly-(2,6-diethyl-1,4-phenylene) ether, poly-(2-methyl-6-ethyl-1,4-phenylene) ether, poly-(2-methyl-6-propyl-1,4-phenylene) ether, poly-(2,6-dipropyl-1,4-phenylene) ether, poly-(2-ethyl-6-propyl-1,4-phenylene) ether and copolymers such as those which contain 2,3,6-trimethylphenol, as well as polymer blends. Poly-(2,6-dimethyl-1,4-phenylene) ether is preferred. The polyphenylene ethers prepared by such a process generally have molecular weights of from 10,000 to 90,000, in particular from 20,000 to 80,000, determined by the method stated in Macromolecular Synthesis -1 (1977), 83. The novel graft polymer preferably contains from 80 to 99.9, in particular from 95 to 99.7, % by weight of polyphenylene ether.

The half esters I of an unsaturated dicarboxylic acid may be substituted in the abovementioned manner. An ammonium cation is $NH_4^{\oplus}$ or an ammonium cation having four identical or different $C_1$–$C_{10}$-alkyl substituents. The substituents must of course be such that they do not hinder the modification reaction. For example, $R^2$, $R^3$ and Q may be hydrogen, and $R^1$ may be $C_1$–$C_{25}$-alkyl, in particular methyl, ethyl, propyl, butyl, pentyl, 2-ethylhexyl or dodecyl. The graft polmer generally contains from 0.1 to 20, in particular from 0.3 to 5%, by weight of the half esters I.

Suitable monomers C which contain olefinic double bonds and can be subjected to graft polymerization are styrene, acrylonitrile, methyl methacrylate, maleic anhydride and mixtures of these, preferably in amounts of less than 10, in particular less than 3%, by weight, based on the graft polymer.

The novel polymers can be modified in a known manner, for example by adding reinforcing agents, fillers, stabilizers, lubricants and flameproofing agents, as well as dyes and pigments.

The graft polymer can be prepared in solution or dispersion, although the graft polymerization is preferably carried out in an extruder. For this purpose, the components are intimately mixed at from 230° to 350° C., preferably from 250° to 300° C., and reacted. If necessary, the melting point of the polyphenylene ether can be varied by means of additives. A twin-screw extruder which can be equipped with kneading elements, some of which have backward-conveying flights, is preferably used. The components are generally metered together an melted in a melting zone of the extruder. This zone is usually adjoined by the reaction zone. A devolatilization zone for removing the volatile components is generally located upstream of product extrusion. The residence time in the extruder is in general from 0.5 to 10, preferably from 1 to 5, minutes. The extruded melt is usually granulated.

The reaction may be carried out in the presence of a free radical initiator, which is preferably an organic peroxide or an azo compound. Such free radical initiators are familiar to the skilled worker. For example, organic peroxides having a decomposition half life (cf. Modern Plastics 36 (1959) Part 2, 142–148) at 200° C. of 1–30 seconds are used. The choice of the free radical initiator depends on the desired reaction temperature. Specific examples are 1,1-di-tert-butylperoxy-3,3,5-trimethylcyclohexane, tert-buty peroxyisopropylcarbonate, tert-butyl peroxy-3,3,5-trimethylexanoate, tert-butyl peracetate, tertbutyl perbenzoate, n butyl 4,4-di-tert-butylperoxyvalerate, 2,2-di-tert-butylperoxybutane, dicumyl peroxide, tertbutyl cumyl peroxide, 1,3-bis-(tert-butylperoxyisopropyl)benzene and di-tert-butyl peroxide.

The free radical initiator may be present in amounts of less than 10, preferably less than 5%, by weight, based on the reactants used. Particularly good products are obtained if the process is carried out in the absence of a free radical initiator, in particular at above 250° 1 C.

Novel polyphenylene ether resins have good heat distortion resistance coupled with a pale natural color, which substantially improves their performance characteristics. They can readily be processed by molding methods for thermoplastics, such as injection molding or extrusion, and can be used as moldings or for coating surfaces.

EXAMPLE 1

99 kg of poly-(2,6-dimethyl-1,4-phenylene) ether having a relative viscosity of 0.50, measured in 1% strength by weight chloroform solution at 25° C., and 1 kg of 2-ethylhexyl monomaleate were reacted with one another in a twin-screw extruder at 270° C., and the product was then devolatilized in a devolatilization zone at 280° C. under reduced pressure. The mean residence time in the extruder was 3 minutes. The melt was cooled by passing it through a water bath, and was granulated, and the granules were dried. The granules were soluble in toluene. The content of half ester in the modified polyphenylene ether resin, determined by IR spectroscopy on a pressed film, was 0.8% by weight.

EXAMPLE 2

99.5 kg of poly-(2,6-dimethyl-1,4-phenylene) ether having a relative viscosity of 0.60, measured in 1% strength by weight chloroform solution at 25° C., and 0.5 kg of 2-ethylhexyl monomaleate were subjected to graft copolymerization as described in Example 1. The granules were soluble in toluene. The content of half ester in the modified polyphenylene ether, determined by IR spectroscopy on a pressed film, was 0.4% by weight.

We claim:
1. A graft polymer of
   (A) a polyphenylene ether as a base polymer and
   (B) a half ester of an unsaturated dicarboxylic acid of the formula

as a graft monomer, where $R^1$ is $C_1$–$C_{25}$-alkyl, $C_2$–$C_{25}$-alkylene or aryl, $R^2$ and $R^3$ are each hydrogen, bromine, chlorine or one of the radicals $R^1$, and Q is hydrogen, an alkali metal, one equivalent of an alkaline earth metal or an ammonium cation.

2. A graft polymr as defined in claim 1, wherein the formula is

where $R^{1a}$ is $C_1$–$C_{25}$-alkyl.

3. A graft polymer as defined in claim 1, of from 80 to 99.9% by weight of component A and from 0.1 to 20% by weight of component B.

4. A graft polymer as defined in claim 3, of from 95 to 99.7% by weight of component A and from 0.3 to 5% by weight of component B.

* * * * *